(12) United States Patent
Xin et al.

(10) Patent No.: US 6,792,190 B2
(45) Date of Patent: Sep. 14, 2004

(54) HIGH DENSITY FIBER OPTIC SPLITTER/CONNECTOR TRAY SYSTEM

(75) Inventors: Xin Xin, Veradale, WA (US); Harley J. McAllister, Valleyford, WA (US)

(73) Assignee: Telect, Inc., Liberty Lake, WA (US)

( * ) Notice: Subject to any disclaimer, the term of this patent is extended or adjusted under 35 U.S.C. 154(b) by 121 days.

(21) Appl. No.: 09/873,097

(22) Filed: Jun. 1, 2001

(65) Prior Publication Data

US 2002/0181922 A1 Dec. 5, 2002

(51) Int. Cl.[7] ................................................. G02B 6/00
(52) U.S. Cl. ..................................... 385/135; 385/137
(58) Field of Search ................................. 385/135, 137, 385/134

(56) References Cited

U.S. PATENT DOCUMENTS

| | | | |
|---|---|---|---|
| 5,167,001 A | | 11/1992 | Debortoli et al. ............ 385/135 |
| 5,323,478 A | | 6/1994 | Milanowski et al. ......... 385/135 |
| 5,339,379 A | * | 8/1994 | Kutsch et al. ............... 385/135 |
| 5,353,367 A | * | 10/1994 | Czosnowski et al. ........ 385/135 |
| 5,363,466 A | | 11/1994 | Milanowski et al. ......... 385/135 |
| 5,402,515 A | * | 3/1995 | Vidacovich et al. ......... 385/135 |
| 5,490,229 A | | 2/1996 | Ghandeharizadeh et al. ..... 385/135 |
| 5,511,144 A | * | 4/1996 | Hawkins et al. ............. 385/135 |
| 5,530,954 A | | 6/1996 | Larson et al. ............... 385/135 |
| 5,689,606 A | | 11/1997 | Hassan ....................... 385/135 |
| 5,887,106 A | | 3/1999 | Cheeseman et al. ......... 385/135 |
| 5,946,440 A | | 8/1999 | Puetz .......................... 385/135 |
| 6,009,224 A | | 12/1999 | Allen .......................... 385/135 |
| 6,504,986 B1 | * | 1/2003 | Wambeke et al. ........... 385/134 |

OTHER PUBLICATIONS

Fiber Optic Management Systems, Components Selection Guide (19 pages).

* cited by examiner

Primary Examiner—Hae Moon Hyeon
(74) Attorney, Agent, or Firm—Wells St. John P.S.

(57) ABSTRACT

A fiber optic splitter tray system with a tray framework with a front end, a rear end, a first side and a second side; a plurality of fiber optic splitters mounted generally transverse to the tray framework, toward the rear end of the tray framework; a plurality of fiber optic adapters mounted generally longitudinally to the framework, the adapters being recessed from the front end of the framework such that fiber optic cables operatively attached to the adapters may be housed within the front end while maintaining a predetermined minimum bend radius in the cables. This may further include a front cable guard movably attached to the tray framework proximate the front end such that the guard is movable vertically downward from a guarding position to a downward position when the tray framework is in an outward position, and further wherein the guard is slidable rearward from the downward position to a downward retracted position.

4 Claims, 5 Drawing Sheets

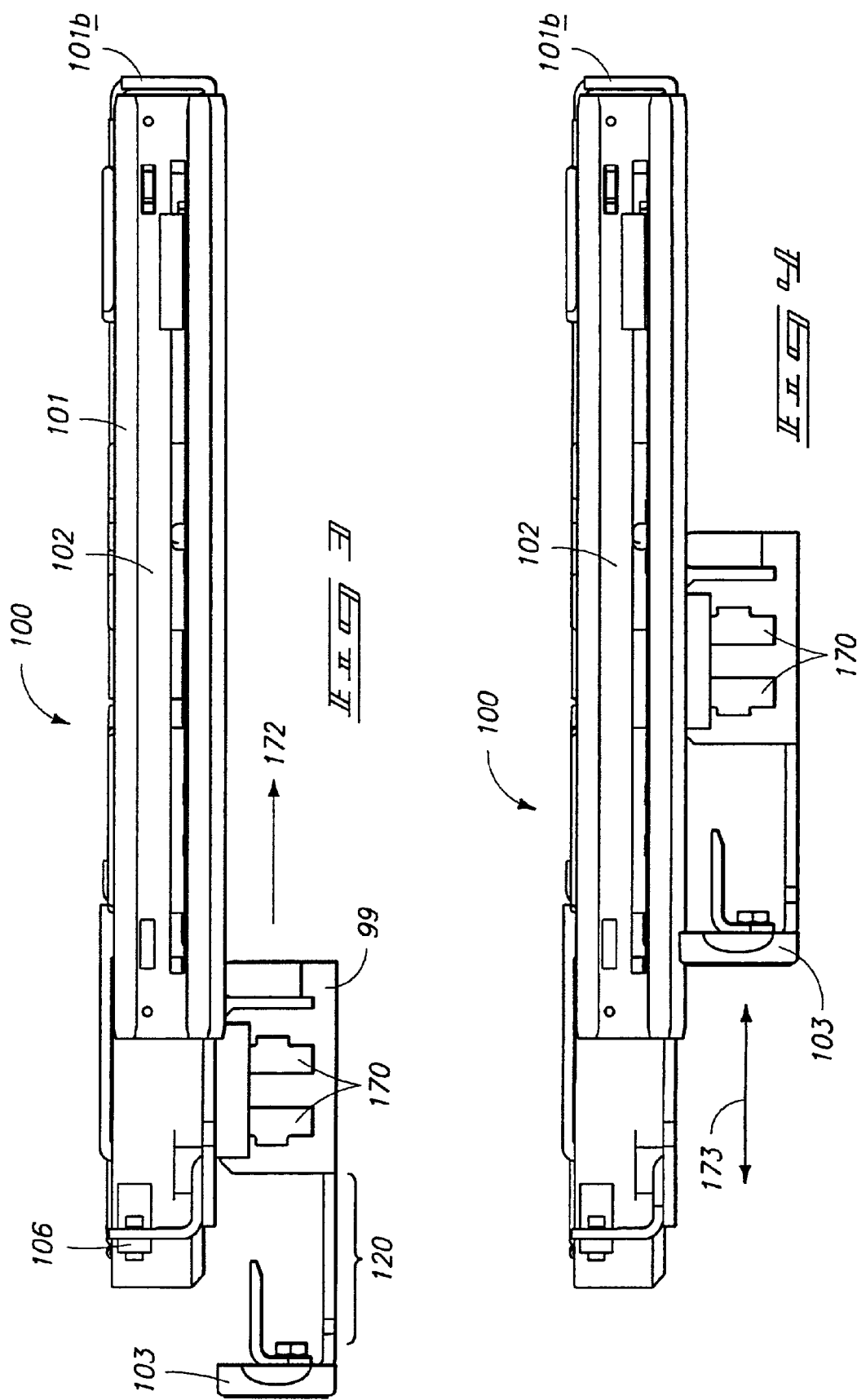

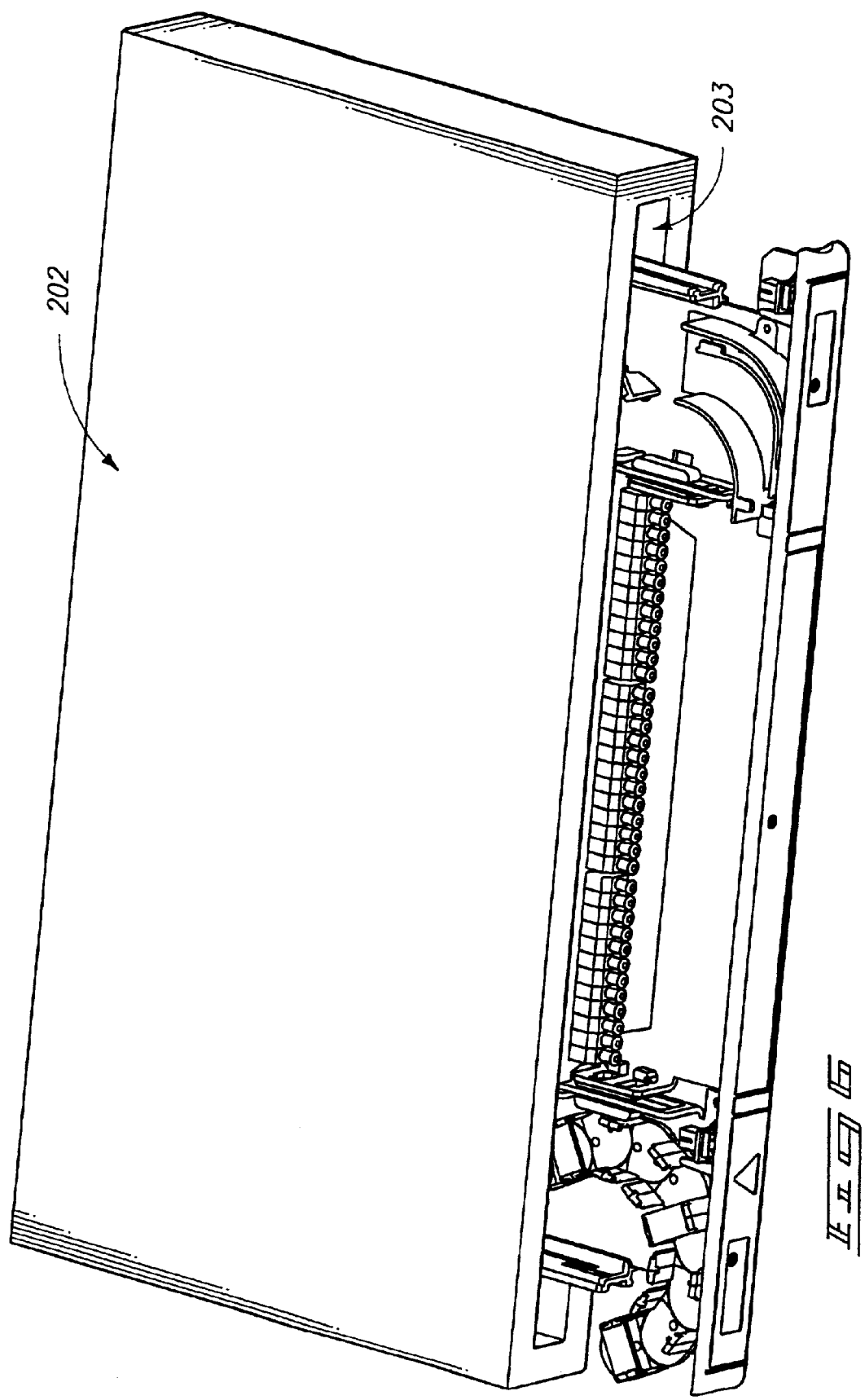

# US 6,792,190 B2

HIGH DENSITY FIBER OPTIC SPLITTER/ CONNECTOR TRAY SYSTEM

TECHNICAL FIELD

This invention relates to a fiber optic splitter tray system, including an apparatus and method, which provides the potential for a higher density splitter apparatus for use in telecommunications.

BACKGROUND OF THE INVENTION

Fiber optic splitters, connectors and adapters are all very well known in the art, and splitters are generally located in the proximity of fiber optic connectors and adapters to allow fiber optic cables to be selectively attached.

With the large increase in demand for telecommunications capacity, there is an increasing need for greater density and capacity in all areas of telecommunications, including signal transmission, connections or cross-connections, and signal splitters. The better utilization of a given amount of space in telecommunications facilities is becoming more and more important.

It is also desired to protect the fiber optic cables which are attached to the adapters, and if the fiber optic cables are protruding beyond the front end of the framework they can be inadvertently damaged. It is therefore desirable to maintain the fiber optic cables within the framework and/or to providing guarding, all within the limited area of the framework.

There has therefore been a need in the art for a higher density fiber optic splitter tray system which also maintains the fiber optic cables within the framework and which still provides sufficient access to the adapters. It is believed that this invention provides a higher density of fiber optic splitters and connectors, while still maintaining the fiber optic cables protected within the framework and accessible adapters, to a level not heretofore achieved in the art. For instance, in an industry-standard footprint of twelve inches deep by nineteen inches wide, this invention may provide twelve splitters, twelve monitor adapters, twelve input adapters and twelve output adapters.

In typical fiber optic adapter configurations such as this, fiber optic cables routed from the adapters which are located on or near the ends of the framework are routed at a sharper angle due to their location near the entry point for the passageway through which they are routed. An embodiment of this invention however provides a dual channel fiber optic routing system in which fiber optic cables nearest the ends or nearest the passageways may be routed through the furthest passageway or channel to provide additional protection.

BRIEF DESCRIPTION OF THE DRAWINGS

Preferred embodiments of the invention are described below with reference to the accompanying drawings, which are briefly described below.

FIG. 3 is a side view of the embodiment of the invention illustrated in FIG. 1, illustrating the vertical movement of the fiber optic cable guard downward from its guarding position;

FIG. 4 is also a side view of the embodiment of the invention illustrated in FIG. 1, illustrating the movement of the fiber optic cable guard in a downward position from the first end toward the second end;

FIG. 6 is a perspective view of the embodiment of the invention shown in FIG. 1, with the tray framework or housing partially slid into a cabinet housing.

DETAILED DESCRIPTION OF THE PREFERRED EMBODIMENTS

Figure 1:
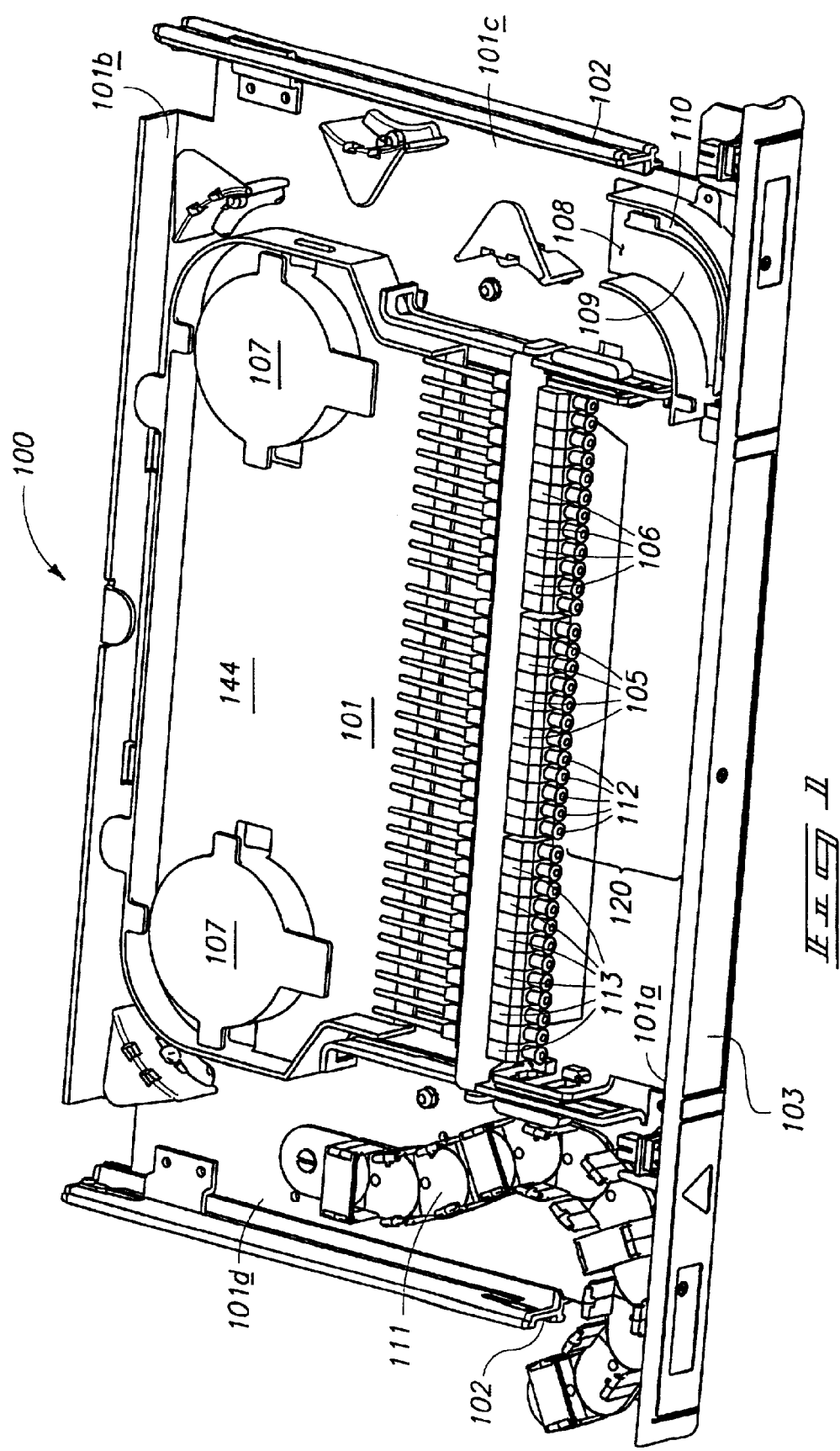
FIG. 1 is a perspective view of one embodiment of this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "framework" as used herein need not be continuous or in any specific number of pieces. However it will be appreciated by those skilled in the art that the framework could be one piece, two pieces or more than two pieces. Furthermore, the framework as contemplated by this invention need not be in one continuous section, but instead may also be divided up into multiple sections or segments.

The term "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber optic cable. Commonly used connectors are, without limitation, ST Connector-Compatible connectors, FC-Type, FCPC, SC, SC-Angled, LC, MU, E2000, and E2000-Angled connectors.

The term "adapter" as used herein is also well known and defined in the art, and is the apparatus which retains the fiber optic connectors and provides the structure to hold the fiber optic connectors and to mount the connectors to other equipment, panels, bulkheads, frameworks, and the like. "Adapter" is sometimes also referred to as a coupling or mating bushing in the industry and is also referred to as ST Connector-Compatible connectors, FC-Type, FCPC, SC, SC-Angled, LC, MU, E2000, and E2000-Angled connectors.

The term "tray" or "tray framework" as used herein is intended to include trays or tray frameworks that slide, pivot, or both, to allow better access to the components mounted on or to the tray or framework. The tray or tray framework may or may not have side walls, a front wall or a rear wall.

The terms "adapter holder" or "adapter holding structure" as used herein, mean a structure, receiver, retainer or framework to which a fiber optic cable adapter may be mounted or attached, such as an FC-type or other type of adapter, as shown more fully in the drawings and described below. The adapter holder will need to be differently sized or configured depending on the type of adapter mounted thereon, according to the geometry of the adapter.

FIG. 1 is a perspective view of one embodiment of this invention, an embodiment in which the splitters are mounted to or in a tray framework 101. FIG. 1 illustrates a fiber optic splitter housing 100, with tray framework 101 which includes a first or front end 101a, a rear or second end 101b, a first side 101c and a second side 101d. A plurality of fiber optic adapters (groups 105, 106 and 113) are mounted to the tray framework and are generally oriented such that fiber optic cables attached to the connectors within the adapters are longitudinal, or from the front end 101a to the rear end 101b of the tray framework 101. This also orients the fiber optic connectors 112 longitudinally.

While this invention is not limited to a tray configuration for the tray framework, FIG. 1 does show this embodiment of a tray, and slide rails 102 are provided to allow the configuration to be slid into and out of the internal cavity of a cabinet structure, as shown in FIG. 6.

Another feature of the invention is the providing of protection to fiber optic cables attached to the adapters toward the first or front end 101a of the housing 100. As can be seen in FIG. 1, the adapters 105, 106 and 113 are recessed from the first end 101a and there is a recessed area or distance 120. Recessing the adapters 105, 106 and 113 provides the recessed area 120 such that fiber optic cables attached to the adapters 105 and 106 may be gradually bent so as not to violate minimum bend radius requirements for the fiber optic cable.

Another feature of embodiments of this invention is to provide easier access to the fiber optic adapters for adding or removing fiber optic cables therefrom. FIG. 1 illustrates fiber optic cable guard 103 which, as will be shown and discussed relative to later figures, may be dropped vertically downward and slid back toward the second end 101b, or rear end, of the housing structure. This effectively allows the operator access to the top and bottom of fiber optic cables connected to adapters 105 and 106 for instance.

Cable management and routing areas are also provided on the structure and also provide minimum bend radius protection, such as fiber optic cable guides 111.

Figure 5:
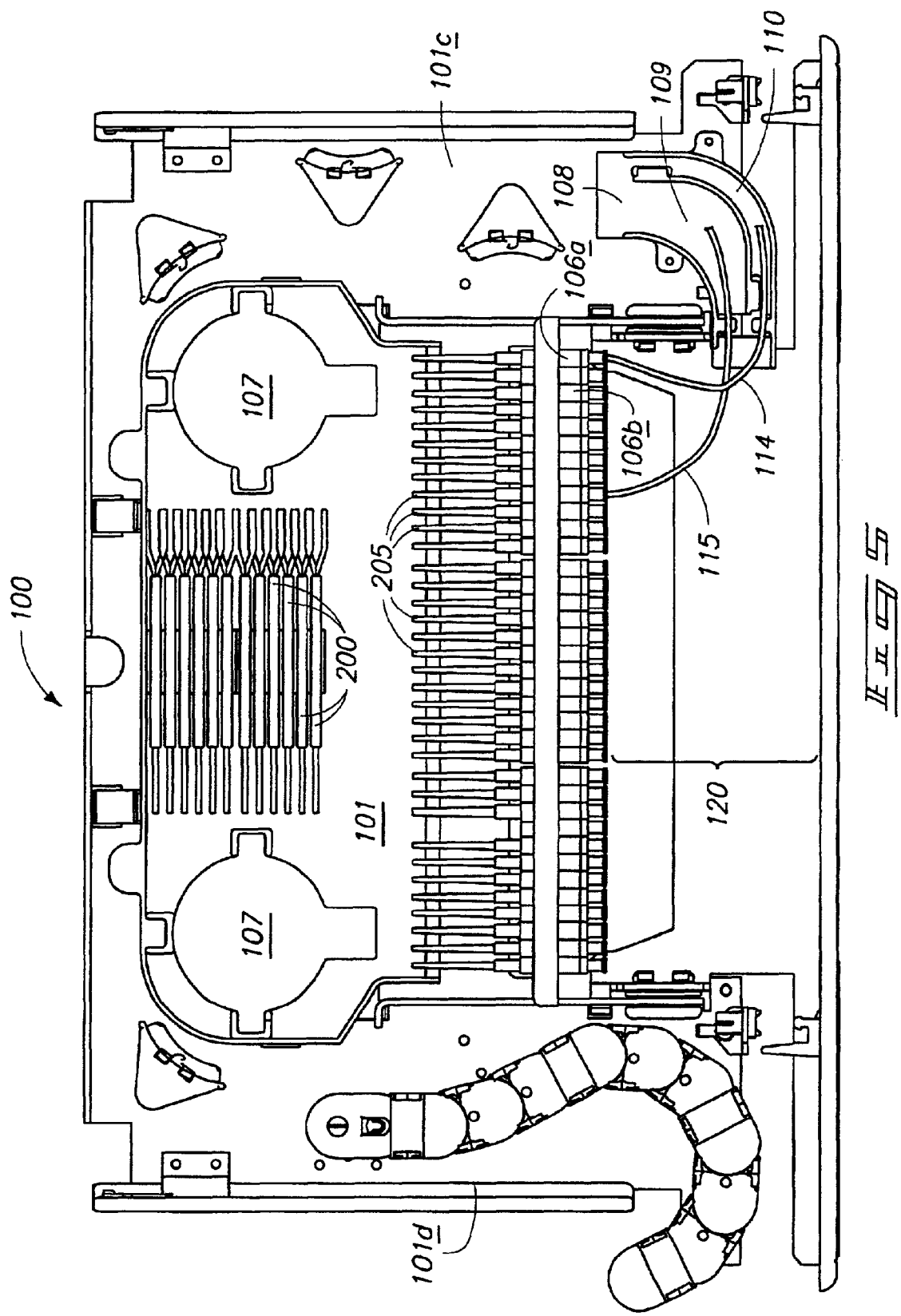
FIG. 5 is a top view of the embodiment of the invention shown in FIG. 1, shown with fiber optic splitters mounted on the framework.

Accessory area 144 is where fiber optic cable splitters are preferably located and spools 107 may be utilized to route fiber optic cable for the splitter area and to route fiber optic cable to the adapters 105 and 106. FIG. 5 more fully illustrates splitters 200 transversely positioned or located in the accessory area 144. It should be noted however that no particular type or kind of splitter is required to practice this invention.

In the preferred embodiment, twelve splitters would be located at accessory area 144 (as shown in later figures) and adapters 105 would be adapters to which output fiber optic cables would be attached, adapters 106 would be fiber optic adapters to which input cables would be adapted, and adapters 113 would be the monitor adapters through which the circuits or lines may be accessed and monitored.

It will be appreciated by those of ordinary skill in the art that the density that may be achieved in a particular standard footprint will vary based on the type of connector or adapter being utilized. This invention achieves increased density regardless of the specific type of connector or adapter. For instance, twelve splitter density may be achieved in an industry standard nineteen inch rack unit if LC and MU connector adapters are utilized due to the reduced size of the connector or adapter. For other connectors or adapters such as ST Connector-Compatible connectors, FC-Type, FCPC, SC, SC-Angled, E2000, and E2000-Angled connectors, this invention also achieves a higher density than heretofore achieved, which would for instance be eight splitter density in an industry standard nineteen inch rack unit.

Figure 2:
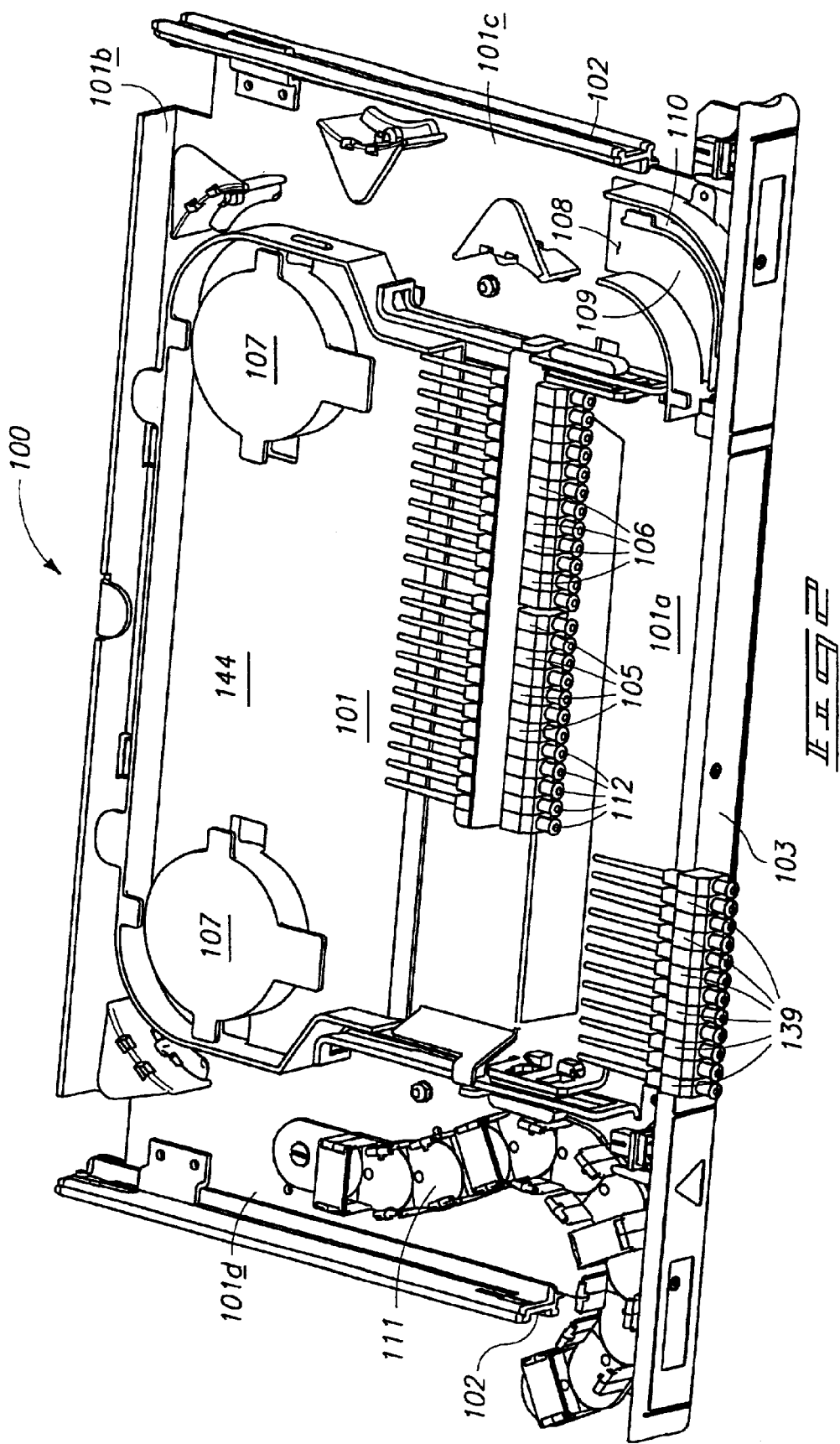
FIG. 2 is a perspective view of another embodiment of this invention, and illustrates monitor adapters accessible from the first end of the housing.

In another embodiment of the invention shown in FIG. 2, the monitor adapters 139 are accessible through the front or guard 103 of the tray framework through an aperture in guard 103 so they may be accessed without sliding the tray out or without otherwise moving the guard or framework. This configuration or embodiment would be most advantageous when temporary or nonpermanent monitoring is desired. In situations where permanent monitoring is desired or advantageous, the configuration shown in FIG. 1 would be preferable so that the more permanent or long-term attached fiber optic cables would be protected by guard 103.

FIG. 2 is a perspective view of another embodiment of this invention, in its tray embodiment, and illustrates the monitor adapters accessible from the first end of the housing, illustrating the configuration referred to above wherein adapters 139 are monitor adapters intended for temporary or nonpermanent monitoring and are affixed to the framework such that one first side of the adapters 139 is accessible through the front of the housing structure or through guard 103. Otherwise the housing 100 is the same as that shown in FIG. 1 with like items being numbered similarly. In FIG. 2, the monitor adapters 139 may be accessed without sliding the tray framework 101 outward and without moving the front guard 103.

In the embodiments shown in both FIG. 1 and FIG. 2, there are twelve monitor adapters, twelve input adapters, and twelve output adapters, which would generally be configured with twelve splitters.

Each adapter is configured with fiber optic connector components internally, all of which are generally well known and developed in the art. Each adapter is configured to receive a fiber optic connector or ferrule at a first end, and attaching the fiber optic ferrule to the adapter also operatively attaches the fiber optic cable to the connectors contained within the adapters. Each fiber optic adapter therefore includes a first end which is oriented toward the first or front end 101a of housing structure 100 and the second end of the adapters is oppositely oriented toward the rear end 101b of the framework 101.

FIG. 3 is a side view of the embodiment of the invention illustrated in FIG. 1, illustrating the vertical movement of the fiber optic cable guard 103 downward from its guarding position (after being released). FIG. 3 illustrates housing structure 100, rails 102, second end 101b of the framework, and guard 103.

As can be seen from FIG. 3, guard 103 is mounted on guard chassis 99. The guard 103 and chassis 99 are releasably mounted to the framework 101 such that when they are released, they drop straight down vertically via guide channels 170 and corresponding guides on framework 101, to the position shown in FIG. 3. The position shown in FIG. 3 is the downward position. Arrow 172 shows the direction which the guard 103 may then be slid to a retracted position so that the adapters shown in FIG. 1 may more easily be accessed by the operator.

FIG. 4 is also a side view of the embodiment of the invention illustrated in FIG. 1, illustrating the movement of the fiber optic cable guard from the first or front end toward the second or rearward end, with the guard in its vertically downward position. FIG. 4 illustrates the guard 103 in the downward and retracted position after it has been slid toward the second end 101b or rear end of the housing structure 100. Rails 102 are utilized to slide the tray from a cabinet, and arrow 173 shows the horizontal sliding direction of connector guard 103.

FIG. 5 is a top view of the embodiment of the invention shown in FIG. 1, shown with fiber optic splitters 200 mounted on the framework 101. FIG. 5 shows spools 107, recessed area 120, and passageway structure 108, with first fiber optic passageway 110 and second fiber optic passageway 109. Housing structure 100 shown in FIG. 5 would typically mount on an industry-standard nineteen-inch rack and constitute one rack unit. One rack unit is approximately 1¾ inches in height, 12 inches deep, and would fit within a nineteen-inch rack width, which means it is typically slightly less than nineteen inches in width. Alternatively, for an industry standard twenty-three inch rack, a rack unit would also traditionally be approximately one and three-quarter inches in height.

The housing structure shown in FIG. 5 would house twelve splitters, twelve input adapters and lines, twelve output adapters and lines, and twelve monitor adapters. This density is much higher than anything in the art that includes a recessed area sufficient to maintain minimum bend radius and splitters in the same housing structure or tray framework.

A first adapter 106a is located toward or at the far end of the row of adapters, or adjacent the first side 101c of the tray framework. A second adapter 106b is located closer to the second side 101d of the tray framework 101 relative to the first adapter 106a. An embodiment of this invention includes operatively attaching a fiber optic cable to the connector within the first end adapter 106a and routing the cable through first fiber optic cable passageway 110. Fiber optic routing structure 108 has a first fiber optic cable passageway 110 and a second fiber optic passageway 109. Fiber optic cables operatively attached to fiber optic connectors within others of the adapters may be routed through second fiber optic passageway 109.

Routing one or more of the fiber optic cables attached to the nearest fiber optic adapters through first fiber optic cable passageway 110, which is further away from the adapters than second fiber optic cable passageway 109, allows better cable management and better bend radius protection so that the nearest fiber optic cables are not unduly bent.

Fiber optic cable 114 is attached to a first end adapter 106a and routed through first fiber optic passageway 110. Fiber optic cable 115 is attached to one of the other adapters and routed through fiber optic passageway 109. It may be preferable to route one or more of the fiber optic cables operatively attached to the nearest fiber optic adapters through first passageway 110 to assure minimum bend radius protection.

FIG. 5 only illustrates two fiber optic cables, but it will be appreciated that these are exemplary and it would be preferred to operatively attach fiber optic cables to the remainder of the adapters.

FIG. 5 further shows a plurality of fiber optic cables 205 operatively attached to the rear side of the adapters, which may be appropriately routed for signal splitting and other fiber optic cable management.

Embodiments of this invention contemplate that the adapters need not be mounted parallel relative to the front end 101a or the rear end 101b of the framework 101, but instead can be at other angles up to approximately forty-five degrees, and are still considered transverse within the contemplation of this invention. Likewise the fiber optic cables operatively attached to the fiber optic connectors or adapters need not be precisely perpendicular to the front end to be considered generally longitudinally oriented, but instead may be at other angles up to approximately forty-five degrees, within the contemplation of this invention. Different alternative angles and configurations may be chosen in preferred embodiments to achieve results such as minimum bend radius and others, all within the contemplation of this invention.

FIG. 6 is a perspective view of the embodiment of the invention shown in FIG. 1, with the tray framework or housing partially slid into the internal cavity 203 of cabinet housing 202. FIG. 6 only shows a one-tray cabinet, but many variations may be utilized within the scope of this invention, including several trays or drawers within one cabinet structure on a rack.

This invention provides a density not heretofore achieved, and for an industry-standard twenty-three-inch rack unit, this invention allows for densities as high as sixteen or more splitters, which means sixteen monitor adapters, sixteen input adapters, and sixteen output adapters.

As will be appreciated by those of reasonable skill in the art, there are numerous embodiments to this invention, and variations of elements and components which may be used, all within the scope of this invention.

One embodiment of this invention for example involves a fiber optic splitter tray system comprised of: a tray framework with a front end, a rear end, a first side and a second side; a plurality of fiber optic splitters mounted generally transverse to the tray framework, toward the rear end of the tray framework; a plurality of fiber optic adapters mounted generally longitudinally to the framework, the adapters being recessed from the front end of the framework such that fiber optic cables operatively attached to the adapters may be housed within the front end while maintaining a predetermined minimum bend radius in the cables. This embodiment may further include a tray chassis configured to slidably mount within a cabinet and/or a front cable guard movably attached to the tray framework proximate the front end. The tray framework may also include a fiber optic cable guard releasably mounted to the tray framework, such that the guard is movable vertically downward from a guarding position to a downward position when the tray framework is in an outward position, and further wherein the guard is slidable rearward from the downward position to a downward retracted position.

The foregoing embodiment may be further comprised of a plurality of fiber optic monitor adapters mounted on the tray framework such that the monitor adapters may be accessed from through the front end of the tray framework, including wherein the monitor adapters may be accessed from through the front end of the tray framework without sliding the tray outward. The monitor adapters may be accessed from through the front end of the tray framework without movement of a front end fiber optic cable guard.

The system disclosed above achieves density levels higher than heretofore achieved within the same distribution rack units and for the same adapters, for instance, this system allows for: six splitters, eight, ten, and even twelve splitters mounted on a tray framework which is sized as an industry-standard nineteen-inch distribution rack unit; and fourteen and sixteen splitters mounted on a tray framework which is sized as an industry-standard twenty-three-inch distribution rack unit.

In another embodiment of this invention, a cable routing system for use in combination with fiber optic adapters is provided and which is comprised of: a framework with a front end, a rear end, a first side and a second side; a first adapter mounted to the framework recessed from the front end and adjacent the first side and with a first fiber optic cable operatively attached thereto, the first fiber optic cable being generally oriented from the front end to the rear end of the framework; a second adapter mounted to the framework recessed from the front end and nearer the second side than the first adapter, and with a second fiber optic cable operatively attached thereto, the second fiber optic cable being generally oriented from the front end to the rear end of the framework; a first and a second fiber optic cable passageway on the tray framework adjacent the first side and generally transverse to the orientation of the first and second fiber optic cables, the first fiber optic cable passageway being further away from the first and the second fiber optic adapters than the second fiber optic cable passageway; the first fiber optic cable passageway being configured to receive the first fiber optic cable such that a pre-determined bend radius protection is provided for the first fiber optic cable; and the second fiber optic cable passageway being configured to receive the second fiber optic cable such that the pre-determined bend radius protection is also provided for the second fiber optic cable.

It will further be appreciated from the foregoing there are method embodiments of this invention, such as a method of routing fiber optic cables which are attached to a plurality of fiber optic cable adapters which are generally aligned, comprising the following steps: providing a tray framework with a front end, a rear end, a first side and a second side; providing a first adapter mounted to the framework recessed from the front end and adjacent the first side; providing a second adapter mounted to the framework recessed from the front end and nearer the second side than the first adapter; providing a first and a second fiber optic cable passageway on the tray framework adjacent the first side and generally transverse to the orientation of the first and second fiber optic cables, the first fiber optic cable passageway being further away from the first and the second fiber optic adapters than the second fiber optic cable passageway; operatively attaching a first fiber optic cable to the first adapter such that it is generally oriented from the front end to the rear end of the framework, and routing the first fiber optic cable through the first fiber optic cable passageway such that a pre-determined bend radius is provided for the first fiber optic cable; and operatively attaching a second fiber optic cable to the second adapter such that it is generally oriented from the front end to the rear end of the framework, and routing the second fiber optic cable through the second fiber optic cable passageway such that a pre-determined bend radius is provided for the second fiber optic cable.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fiber optic splitter tray system comprised of:
   a tray framework with a front end, a rear end, a first side and a second side;
   a plurality of fiber optic splitters mounted generally transverse to the tray framework, toward the rear end of the tray framework;
   a plurality of fiber optic adapters mounted generally longitudinally to the framework, the adapters being recessed from the front end of the framework such that fiber optic cables operatively attached to the adapters are housed within the front end while maintaining a pre-determined minimum bend radius in the cables; and further comprising a fiber optic cable guard releasably mounted to the tray framework, such that the guard is movable vertically downward from a guarding position to a downward position when the tray framework is in an outward position, and further wherein the guard is slidable rearward from the downward position to a downward retracted position.

2. A fiber optic splitter tray system as recited in claim 1, and further wherein the monitor adapters are accessible from through the front end of the tray framework without movement of the front end fiber optic cable guard.

3. A fiber optic cable routing system for use in combination with fiber optic adapters, comprised of:
   a tray framework with a front end, a rear end, a first side and a second side;
   a first adapter mounted to the framework recessed from the front end and adjacent the first side and with a first fiber optic cable operatively attached thereto, the first fiber optic cable being generally oriented from the front end to the rear end of the framework;
   a second adapter mounted to the framework recessed from the front end and nearer the second side than the first adapter, and with a second fiber optic cable operatively attached thereto, the second fiber optic cable being generally oriented from the front end to the rear end of the framework;
   a first and a second fiber optic cable passageway on the tray framework adjacent the first side and generally transverse to the orientation of the first and second fiber optic cables, the first fiber optic cable passageway being further away from the first and the second fiber optic adapters than the second fiber optic cable passageway;
the first fiber optic cable passageway being configured to receive the first fiber optic cable such that a pre-determined bend radius protection is provided for the first fiber optic cable; and
   the second fiber optic cable passageway being configured to receive the second fiber optic cable such that the pre-determined bend radius protection is also provided for the second fiber optic cable.

4. A method of routing fiber optic cables which are attached to a plurality of fiber optic cable adapters which are generally aligned, comprising the following steps:
   providing a tray framework with a front end, a rear end, a first side and a second side;
   providing a first adapter mounted to the tray framework recessed from the front end and adjacent the first side;
   providing a second adapter mounted to the tray framework recessed from the front end and nearer the second side than the first adapter;
   providing a first and a second fiber optic cable passageway on the tray framework adjacent the first side and generally transverse to the orientation of the first and second fiber optic cables, the first fiber optic cable passageway being further away from the first and the second fiber optic adapters than the second fiber optic cable passageway;
   operatively attaching a first fiber optic cable to the first adapter such that it is generally oriented from the front end to the rear end of the tray framework, and routing the first fiber optic cable through the first fiber optic cable passageway such that a pre-determined bend radius is provided for the first fiber optic cable; and operatively attaching a second fiber optic cable to the second adapter such that it is generally oriented from the front end to the rear end of the tray framework, and routing the second fiber optic cable through the second fiber optic cable passageway such that a pre-determined bend radius is provided for the second fiber optic cable.

* * * * *